United States Patent Office 3,084,445
Patented Apr. 9, 1963

3,084,445
TEST DEVICE
Anthony G. Klimaytis, Philadelphia, Pa., assignor to the United States of America as represented by the Secretary of the Army
Filed Sept. 2, 1960, Ser. No. 53,853
1 Claim. (Cl. 33—174)
(Granted under Title 35, U.S. Code (1952), sec. 266)

The invention described herein may be manufactured and used by or for the Government for governmental purposes without the payment to me of any royalty thereon.

This invention relates to test devices or gages and more particularly to gages such as are utilized to inspect an object for geometric symmetry with respect to another object or reference base.

Various means are available for inspecting the concentricity or symmetry of one or more parts in relation to another. The most common of these is a dial indicator mounted in a fixed relation to the part to be inspected. Obviously the indicator point, which actuates the indicator hand in relation to a graduated scale of known value, may initially contact the tested object at any point about its periphery. This means that the indicator hand cannot be set to zero because at the initial point of contact the diameter may be mean, minimum, maximum, eccentric or concentric in relation to the reference base around the axis of which the inspected part rotates. Under these conditions, the inspector must rotate the inspected part through an angle of 360 degrees and note and remember the variation between the extreme positions, clockwise, and counter-clockwise, of the indicator hand.

Obviously this method of inspection is slow and tedious when one part or feature is to be inspected and the demands on the inspector become more stringent as the number of features undergoing inspection increases. In accordance with the present invention, this difficulty is avoided by the provision of means whereby all the dial readings start from a known point. This makes it possible for the tolerance zone to be marked on the dial so that the inspector has to watch only one extreme of the tolerance zone to see that it is not exceeded.

The invention will be better understood from the following description when considered in connection with the accompanying drawings and its scope is indicated by the appended claim.

Referring to the drawings.

Figure 1:
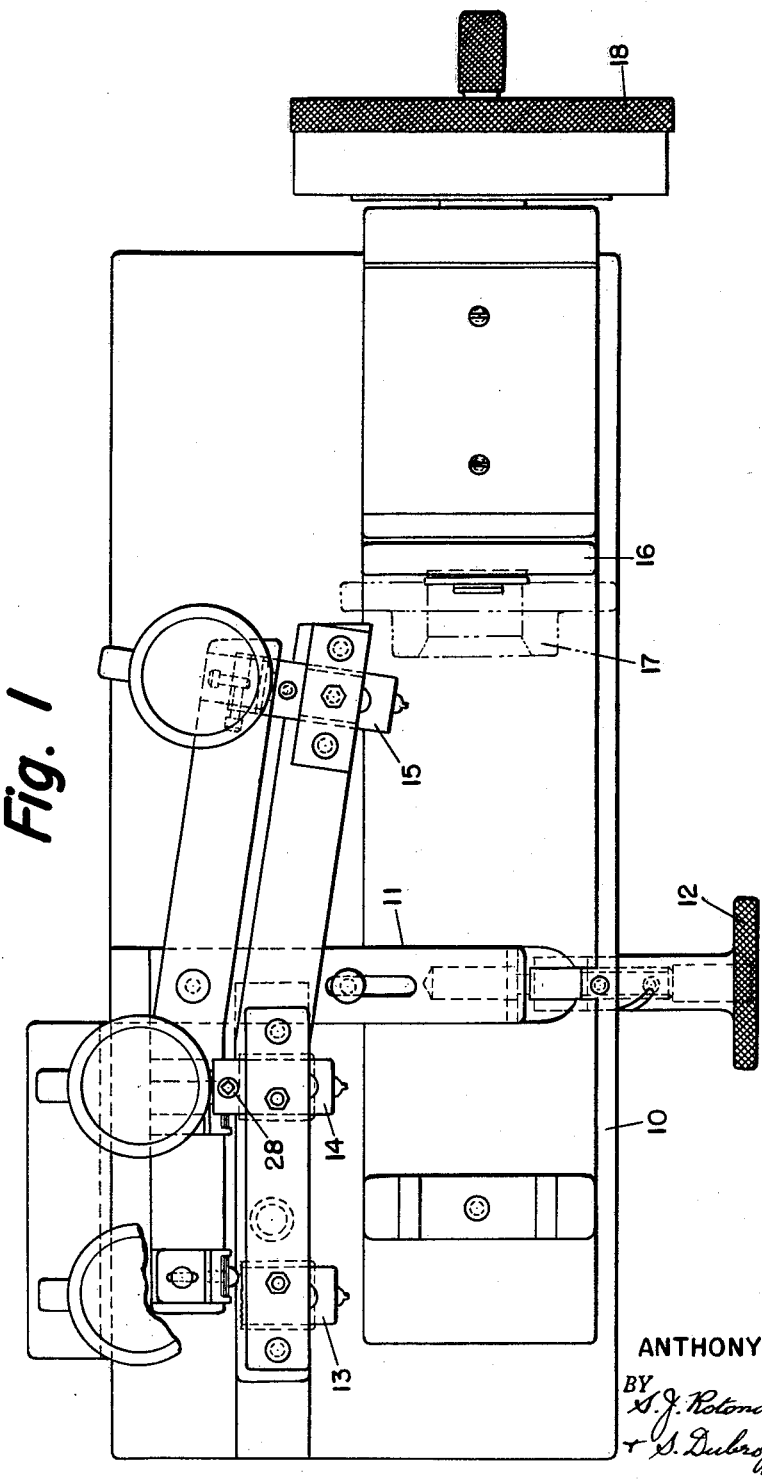
FIG. 1 is a top view of a gage illustrating one application of the invention.
Figure 2:
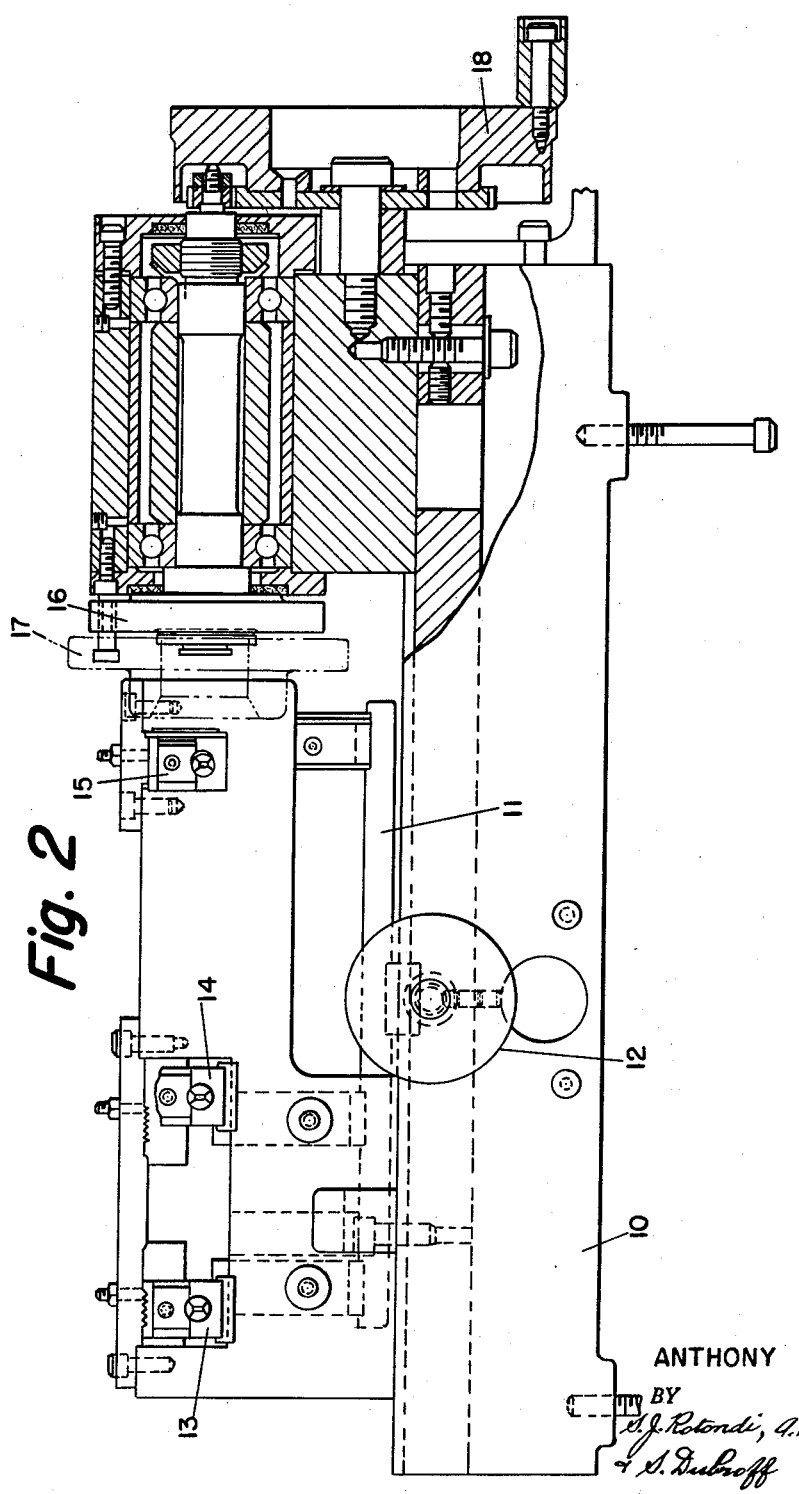
FIG. 2 is a front view of the gage illustrated by FIG. 1.
Figure 3:
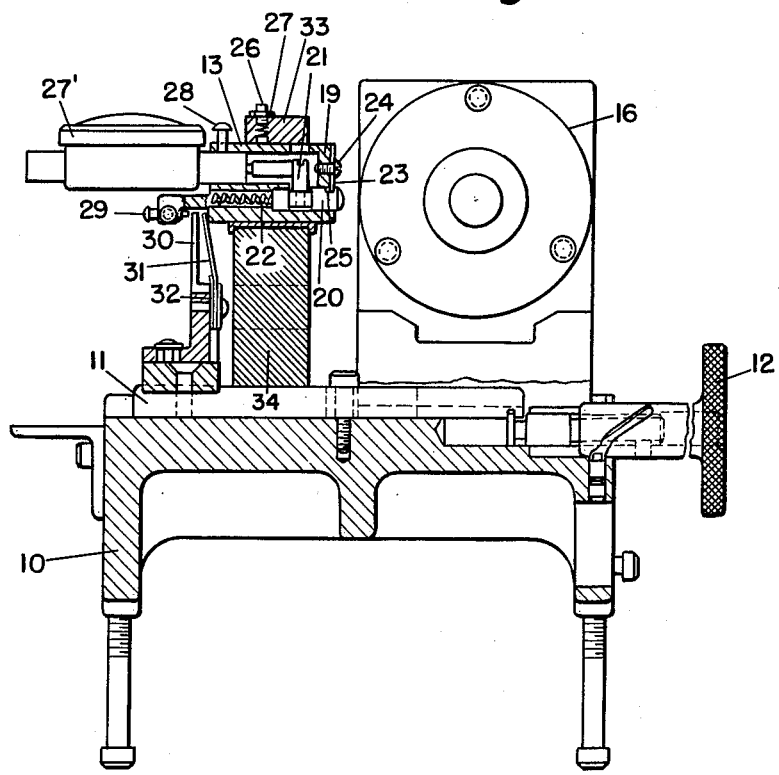
FIG. 3 is an end view of the gage, certain important features of the invention being shown in section.

The illustrated gage includes a base 10 and a support 11 which is movable traversely of this base by rotation of a knob 12. Supported upon an upright 34 and movable with respect thereto by the member 11 are a plurality of heads 13, 14 and 15.

Also supported by the base 10 is a work holder 16 which has fixed to it a thread ring 17 and is rotatable by means of a handwheel 18. It will be understood that the form of the means for holding the object during its inspection is dependent on the shape of the object. In the present instance, this object is assumed to be a shell which is to be inspected at three different places about its periphery. This shell is threaded at the end and is readied for inspection by threading its end snugly into the thread ring 17.

The head 13 is similar to the heads 14 and 15. It includes a body 19 within which are mounted a pin 20 which has threaded into it a pin 21 and is urged into engagement with the tested object by a spring 22. A key plate 23 is fixed to the body 19 by a screw 24 and has its lower edge in slot 25 near the end of the pin 20 for limiting the travel range of this pin. A spring plunger 26 is locked by a nut 27 in a position such that the frictional force of the plunger point against the body 19 is great enough to overcome the end pressure exerted by spring 22 and dial 27 when the pin 20 is actuated. Also associated with the head 13 are a screw 28 for locking the dial indicator 27 to the body 19, a screw 29 arranged to cooperate with a stop 30 and a spring 31 fixed to and spaced from the stop 30.

From the foregoing description, it can be seen that the pin 20 is movable in response to the application of a relatively weak force and that the application of a relatively strong force is required to move the head 13 in its support. How these forces are utilized in the operation of the gage is hereinafter explained.

Before the inspecting machine or gage is put into operation, (1) the face of dial 27' is marked to show the tolerance zone with one of its limits at zero, (2) the pin 20 is pushed into the body 19 as far as it will go, and (3) the dial indicator is inserted against pin 21 until it is preloaded approximately .015 and is then locked in place by the screw 28. This done the bezel on the dial indicator 27' is rotated to coincide the indicator hand with zero on the dial face and locked in place. For ease in reading the indicators on heads 13, 14 and 15, it is desirable that all their zeros be located in the same position relative to the inspected feature.

In the operation of the gage, the knob 12 is first turned counter-clockwise fully. This retracts the heads 13, 14 and 15 to locations which permit assembly of a shell in the thread ring 17. Such assembly is effected by counter-clockwise rotation of the handwheel 18 and by rotation of the knurled flange on the thread ring.

The knob 12 is then turned clockwise fully. This rotation of the knob functions through support 11, stop 30, end spring 31 to move the heads 13, 14 and 15 until their pins 20 contact the shell and bottom on the body 19. As previously explained, the heads are frictionally loaded by spring plungers 26, so as to overcome the combined forces of the spring 22 and the spring in the dial indicator 27'. Leaf spring 31 is designed to move the head under the load of the plunger 26 so that pin 20 will make a shockless contact with the shell. If necessary, the tension of spring 31 can be increased by means of an auxiliary spring 32 between it and the stop 30.

The next step in the operation of the gage is to turn the knob 12 slightly counter-clockwise until the knob is in free position without pressure. This action releases the force of the leaf spring 31 on the head without moving the head so that the head is now free of all force except that applied through the pins 20 and 21 and the point or actuating member 33 of the indicator 27 thereby establishing a reference base.

The handwheel 18 is now rotated one turn in either direction. Since there is a six to one ratio movement of the thread ring 17 to the handwheel, the shell will have made six complete revolutions. As it revolves it pushes the heads 13, 14 and 15 to the respective extreme maximum points from the center of rotation thereby establishing a reference base. Thereafter the heads remain in these positions.

As the shell continues to rotate, the spring loaded pin 20 will engage the shell and the indicator will register the extreme minimum distance from the center of rotation at the respective points.

Since the indicator hand is set at zero at a definite relation between the body 19 and pin 20 and that relationship is constantly maintained at the maximum extreme, the inspector need only watch to see that the indicator hands do not exceed the minimum extreme limits on the dial faces. If air gages are used, instead of dial indicators, the pin 21 is utilized to actuate the air flow valves which in turn affect the relative positions of the floats in the tubes with the graduated scales. By turning the knob 12 counter-clockwise fully, the heads are retracted sufficiently to permit removal of the shell.

The controlled location of the tolerance zone on the face of the dial indicator and the fact that only one end of the zone must be watched makes for easier inspection. The controlled zone also permits use of larger magnification. This is so because in the use of a conventional measuring device, the range must include dimensional variations plus the symmetry tolerance while the above described gage cancels out the dimensional tolerance and deals solely with the symmetry tolerance. The resulting larger magnification results in a more accurate, easier to read and therefore more rapid inspection.

I claim:

In a device for testing the symmetry of a circular object, the combination therewith of
- a base,
- a support mounted on said base and movable transversely thereof,
- a body movable in said support,
- a member extending from and reciprocable in said body between a fixed inner limit and a fixed outer limit,
- a spring urging said member toward said outer limit with a first force,
- indicator means fixed to said body and urging said member toward said outer limit with a second force, said indicator means having a zero reading when said member is at said inner limit,
- means exerting between said support and said body a frictional force greater than the sum of said first and second forces,
- means fixed to said base for rotatably supporting said object with its longitudinal axis extending longitudinally of said base,
- means for moving said support to maintain said member in engagement with said object,
- means for rotating said object about its longitudinal axis to establish a zero reading of said indicating means upon the engagement of said member with the point of said object most remote from its longitudinal axis, and
- means for cushioning said movement of said member upon said establishment of said zero reading.

References Cited in the file of this patent

UNITED STATES PATENTS

| | | |
|---|---|---|
| 1,558,294 | Sandbo | Oct. 20, 1925 |
| 2,406,793 | Benkoe | Sept. 3, 1946 |
| 2,913,829 | Arlin | Nov. 24, 1959 |